July 26, 1966 T. W. PIOTROWSKI 3,262,369
MACHINE TOOL POWER DRAWBOLT MECHANISM
Filed Feb. 19, 1965 2 Sheets-Sheet 1

INVENTOR.
Tadeusz W. Piotrowski
BY
Howard T. Keiser
& Jack J. Earl
ATTORNEYS

July 26, 1966 T. W. PIOTROWSKI 3,262,369

MACHINE TOOL POWER DRAWBOLT MECHANISM

Filed Feb. 19, 1965 2 Sheets-Sheet 2

United States Patent Office 3,262,369
Patented July 26, 1966

3,262,369
MACHINE TOOL POWER DRAWBOLT
MECHANISM
Tadeusz W. Piotrowski, Cincinnati, Ohio, assignor to The
Cincinnati Milling Machine Co., Cincinnati, Ohio, a
corporation of Ohio
Filed Feb. 19, 1965, Ser. No. 433,889
10 Claims. (Cl. 90—11)

This invention relates to machine tool spindle mechanisms in which a drawbolt is included for the purpose of releasably securing a cutting tool in place in the spindle.

Power actuated drawbolts of various types and modes of operation are known in the art but these mechanisms have not been completely satisfactory, although workable, for various reasons. Some of the mechanisms are unduly large and complex and therefore require considerable space. It is a well known phenomenon that it usually requires more torque to release the drawbolt from the cutter than it requires to secure the two firmly together. Therefore the drawbolt power transmission must operate under two different standards, one for take-up, the other for release. This has resulted in the rather large and complex nature of the mechanisms which must be able to provide sufficient torque for firm take-up of the cutter and then have greater release torque to permit removal of the cutter. Machine tool spindle carriers are complex and crowded mechanisms even without the power drawbolt and the provision for these power drawbolt mechanisms requires enlargement of the carrier to a considerable extent. This is undesirable from the standpoint of cost of material and machine space requirements. It is also the conventional practice to provide a separate motor to power the drawbolt mechanism even though the spindle power source is also included in the spindle carrier, it generally being determined that the drawbolt mechanism cannot tolerate the power input that would be provided from the spindle power source. This extra drawbolt motor increases cost, enlarges the spindle carrier and increases the complexity of mechanism and control.

It is therefore an object of this invention to provide a very small but effective power drawbolt mechanism.

It is also an object of this invention to provide a drawbolt mechanism that provides two greatly different amounts of torque when driven first one way and then the other to provide firm take-up and sufficient release power.

A further object of this invention is to provide a power drawbolt mechanism that is operated from the same power source as the spindle itself.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

This invention employs a cascaded clutch mechanism which is selectively operable to connect the drawbolt in a drive train from the same source of torque that produces rotation of the spindle. One clutch is released from the other when a resistive torque of a predetermined magnitude is encountered as when the drawbolt is tightened firmly into the cutter. However, the drive through the two clutches is positively transmitted when the drive is in the other direction to release the cutter so that a much greater torque is applied to break loose the drawbolt from the cutter. The clutches are shiftable as a unit between operative and inoperative positions. In the operative position, the drive train is completed from the source of spindle drive torque to the drawbolt and at the same time the spindle is locked to prevent its rotation with the drawbolt to facilitate rotation of the drawbolt relative to the cutter and spindle. In the preferred embodiment to be described in detail hereinafter, the cascaded clutches include a sprag type clutch adapted for bidirectional or two way transmission of torque to a friction cone clutch preloaded for transmission of only a limited amount of the available torque from the power source. This limited torque is utilized in driving the drawbolt one way for cutter take-up. A clutch bypass system is provided to positively connect the sprag clutch to the output or driven portion of the cone clutch that is connected the drawbolt, thus driving the drawbolt in the other direction with the full torque available from the source to loosen or release the cutter. To prevent excessive slippage at the cone clutch, the mechanism is made responsive to slippage so that the sprag clutch is released from the cone clutch when slippage occurs during the drive in the one clutch direction for take-up of the cutter. The details of the construction and operation of the preferred embodiment will be apparent from the following detailed description and from the attached drawings wherein:

Figure 1:
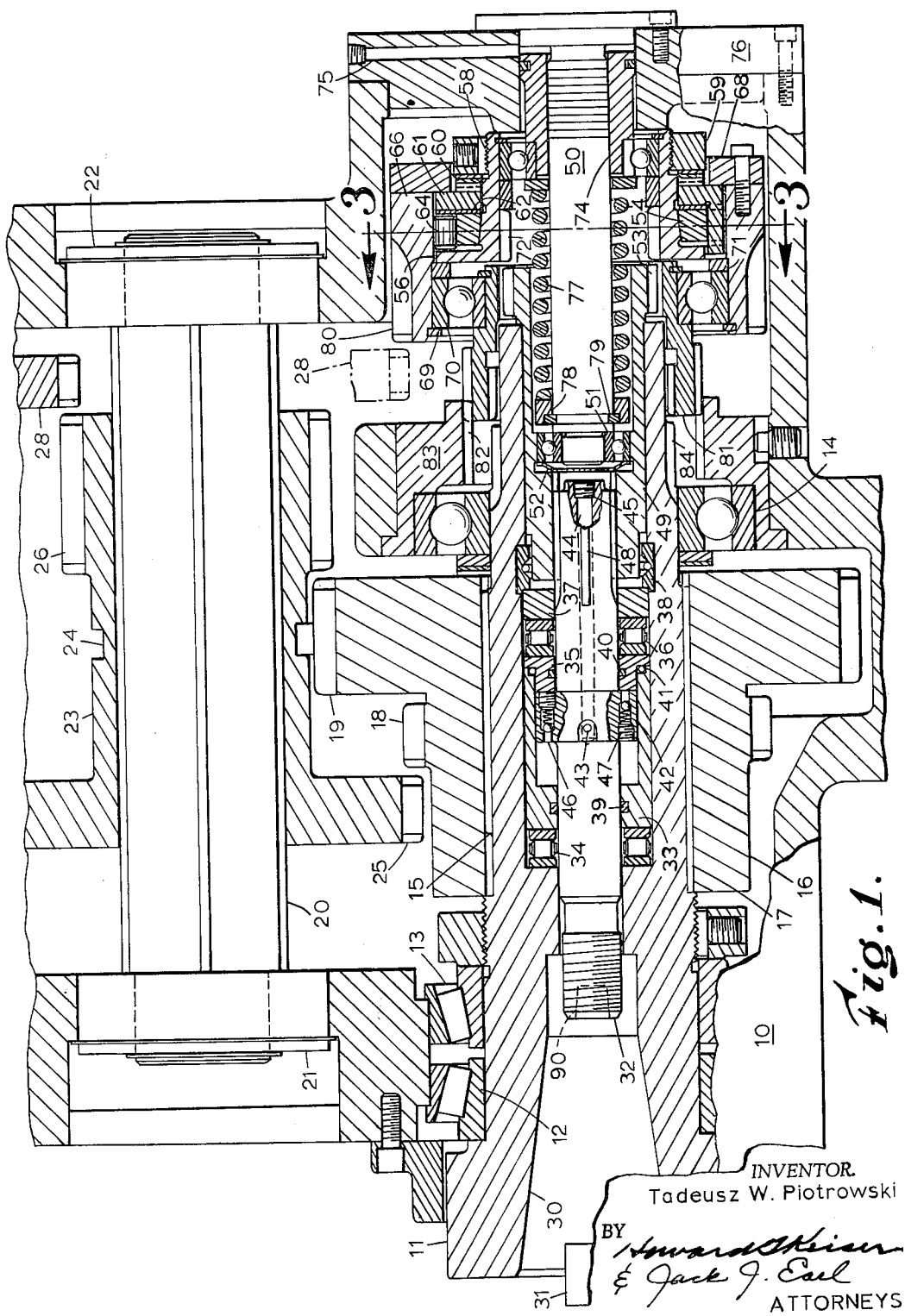
FIG. 1 is a longitudinal section view of a milling machine spindle carrier.
Figures 2, 3:
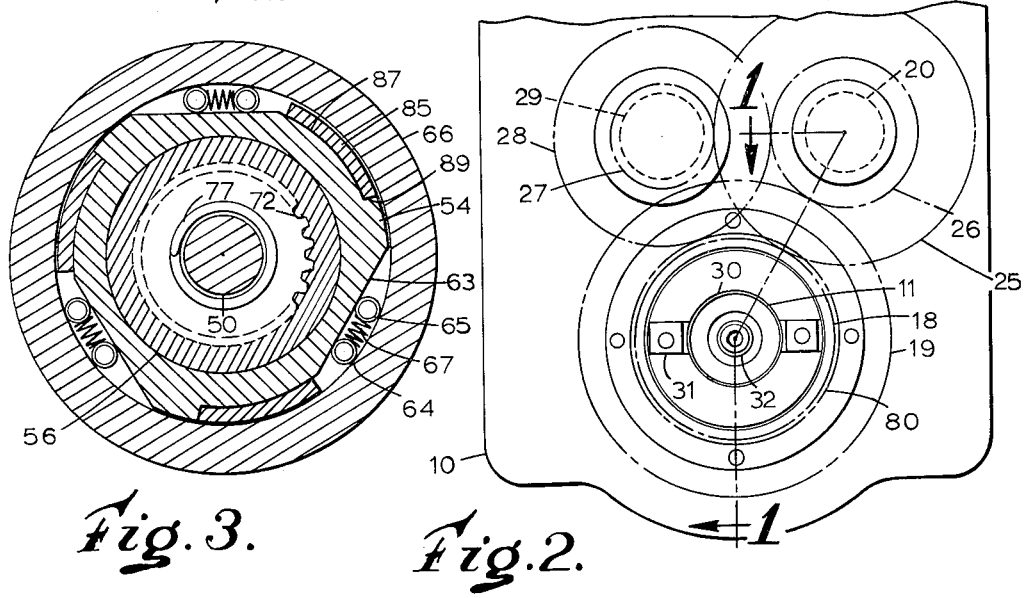
FIG. 2 is a front elevation view of the spindle carrier of FIG. 1 wherein the line of development of the section of FIG. 1 is indicated by the line 1—1.
FIG. 3 is a transverse section of the mechanism as viewed on line 3—3 of FIG. 1.

There is shown in FIGS. 1 and 2 a spindle carrier housing 10 in which a spindle 11 is supported by main bearings 12, 13 and a rear bearing 14. The middle portion of the spindle 11 has axial splines 15 formed thereon over which a gear member 16 is received. The gear member 16 has a splined bore 17 that mates with the splines 15 to provide a driving engagement therebetween. The gear member 16 has both a high speed gear ring 18 and a low speed gear ring 19 formed integrally thereon. An idler shaft 20 is provided in the carrier 10 and is rotatable in supporting bearings 21, 22. The shaft 20 is splined and a gear member 23 is received thereover for axial sliding movement by a mechanical shifter fork, not shown, adapted to grip the member 23 at the neck 24. A high speed drive gear 25 and a low speed drive gear 26 are formed on the member 23 and these are engageable selectively with the spindle gears 18, 19, respectively, when the member 23 is shifted along the shaft 20 to the left or the right from the position shown in FIG. 1. The gears 25 and 26 also mesh with power input gears 27 and 28, respectively, when shifted into engagement with the gears 18, 19. The gears 27, 28 are fixed on a shaft 29 in the carrier 10 which is the output shaft of a conventional multi-speed transmission powered by a spindle motor (not shown) and for purposes of this invention, the shaft 29 and the gears 27, 28 thereon can be considered as the input source of torque that is selectively connected by the described gears and shafts to produce rotation of the spindle 11.

As shown, the spindle 11 is adapted at its forward end for the insertion of a cutting tool shank (not shown) by the provision of a tapered socket 30. The spindle 11 is also furnished with the conventional cutter drive keys 31 attached to the forward end of the spindle 11. A drawbolt 32 is included in the spindle 11 for the purpose of holding the cutting tool firmly seated in the socket 30 when it is threaded into the rearward portion of the tool. The drawbolt 32 is sized at its forward portion to be a running fit through both the spindle 11 and a bushing 33 fitted into the spindle 11 from its rearward end. The bushing 33 is also rotatable in the spindle 11 and is received at its forward end against a roller thrust bearing 34. The rearward end of the bushing 33 is closed around the drawbolt 32 by a cap 35 that is fixed to the bushing by set screws (not shown). A thrust bearing 36 is held against the cap 35 by a spacer 37 which is secured in the spindle 11 by a spring expanded snap ring 38 that is seated in a groove around the spindle bore. Therefore the bushing 33 and its cap 35 are axially fixed in the spindle 11 although they can rotate therein.

The bushing 33 and cap 35 define a cylinder around a portion of the drawbolt 32 and appropriate fluid seals 39, 40, 41 are provided to render the cylinder fluid tight. The drawbolt 32 has an enlarged diameter portion 42 which defines a piston in the cylinder and the stroke of the piston 42 determines the length of axial stroke through which the drawbolt 32 can move in the spindle 11. The mechanism is assembled and the cylinder within the bushing 33 is filled with fluid through an access port 43 and a passage 44 which is then closed by a plug 45 to confine the fluid within the bushing 33. The piston 42 has a pair of oppositely operable check valves 46, 47 which permit the fluid to be transferred from one side of the piston 42 to the other as the drawbolt 32 is moved axially within the bushing 33. The check valve 46 is set so that it will remain closed until substantial pressure is acting thereon so that the drawbolt 32 tends to remain in a fixed axial position in the cylinder until a substantial axial force is applied thereto as when it is forcefully rotated while in threaded engagement with a tool seated firmly in the socket 30. The other valve 47 may operate under relatively low pressure to permit the drawbolt 32 to be moved rearwardly in the spindle 11 with a minimum of force.

The rearmost portion of the drawbolt 32 is formed with drive splines 48 by means of which a drive torque is transmitted to it to effect its rotation in one way or the other to take up or release a cutting tool. A drive bushing 49 having internal splines received over the splines 48 is rotatably received in the spindle 11 behind the drawbolt 32. A stud 50, fixed in the carrier 10 and in axial alignment with the drawbolt 32 extends into the drive bushing 49 where it supports a bearing 51 over which the bushing 49 rotates. A spring washer 52 is received between the bearing 51 and the bushing 49 to hold it in axial position in the spindle 11. The bushing 49 has a gear 53 formed around the portion thereof that extends out of the spindle 11 and it is to this gear that torque is applied for driving the drawbolt 32.

Figure 4:
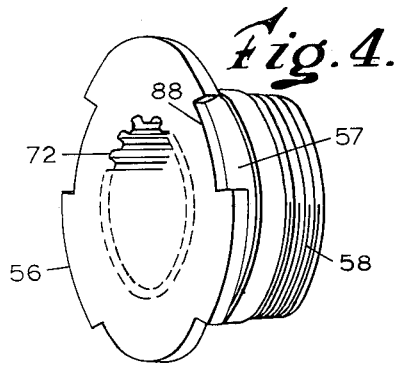
FIGS. 4 through 7 are detail views in perspective of members included in the mechanism and particularly those shown in transverse section in FIG. 3.
Figure 5:
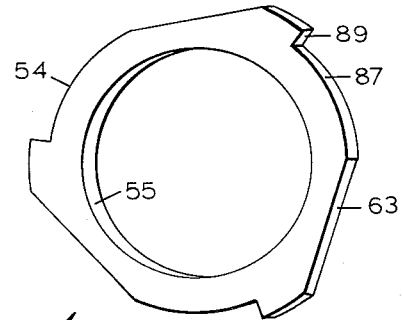
Figure 6:
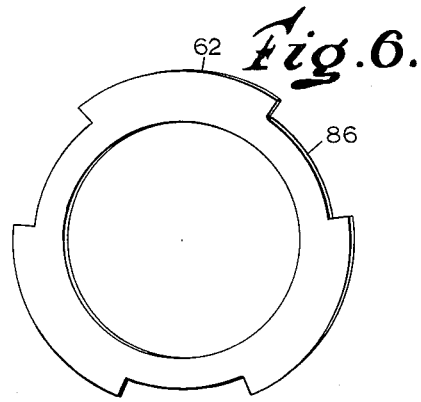
Figure 7:
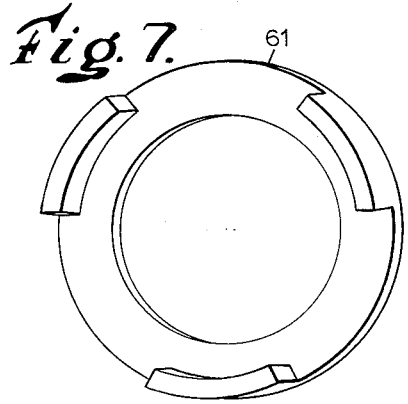

The drive to the gear 53 is through a cascaded clutch mechanism that is included in the carrier 10 and arranged concentrically around the drawbolt 32 and behind the bushing 49. The clutch mechanism includes two clutches, one comprising a cone type friction clutch having a female member 54 with an internal cone surface 55 (FIG. 5) and a male member 56 having an external cone surface 57 (FIG. 4) adapted to mate closely in the surface 55. The male member 56 has a threaded portion 58 over which a nut 59 is threaded to compress a stack of spring washers 60 together against a disconnect member 61 (FIG. 7). The disconnect member 61 is received against a washer 62 (FIG. 6) that in turn bears directly against the female member 54 to hold the cone surfaces together with a force of a predetermined magnitude. This force determines the torque force which will be transmitted between the cone clutch members 54, 56 through engagement of the surfaces 55, 57 before the cone clutch members 54, 56 slip relative to one another at the surfaces 55, 57.

The female clutch member 54 has a set of flat surfaces 63 formed on the peripheral area thereof and these provide the surface to which a torque force is transmitted by the other of the two cascaded clutch mechanisms. As shown best in FIG. 3, the surfaces 63 each have a set of two rollers 64, 65 which are the sprag driving elements of the second clutch mechanism. The sets of rollers 64, 65 are received between the flat surfaces 63 and the inner diameter surface of a member 66 and the rollers 63, 64 of each set are held separated by a spring 67. When the member 66 is rotatably driven in either direction one of the rollers 64, 65 will be firmly wedged between the member 66 and the female clutch member 54 so that the two will rotate in unison. The complete clutch assembly is held together between a face member 68 secured by the outer clutch member 66 and a snap ring 69 inside the member 66 that holds a bearing 70 against a spacer 71 which in turn is received directly against the male clutch member 56.

The entire cascaded clutch assembly is axially movable in the carrier 10 from the inoperative position in which it is shown to an operative position wherein the gear 53 is engaged by a gear 72 formed inside the male clutch member 56 so that the drawbolt 32 is selectively connectable in train with the source of power. The male clutch member 56 is rotatably supported on a bearing 73 that is attached on a piston sleeve 74. The sleeve 74 is adapted to slide axially along the stud 50 and a fluid passage 75 is provided through a cap member 76 secured in the carrier 10 for the purpose of admitting fluid under pressure from a selectively operable device such as a solenoid actuated control valve (not shown) to the face area of the sleeve at the right end (as viewed in FIG. 1). This fluid under pressure will produce a force to shift the sleeve 74 leftward against a bias spring 77 which is compressed between the sleeve 74 and a collar 78 held on the stud 50 by a retainer 79. This carries the clutch assembly to its operative position to engage the gears 53 and 72. At the same time, a gear 80 formed around the outside of the member 66 is moved into engagement with the driving gear 28 to complete the drive train from power source represented by the shaft 29 and gear 28 to the drawbolt 32.

In order that the drawbolt 32 be rotated inside the spindle 11, the spindle 11 must be prevented from rotating when the described clutch mechanism is shifted to its operative position. Therefore a gear 81 is rotatably supported in the bearing 70 and is in sliding engagement with a gear 82 formed inside a bushing 83 in which the bearing 14, rotatably supporting the rearward end of the spindle 11, is received and which is fixed in the carrier 10. The gear 81 moves axially in unison with the clutch mechanism and when in the operative position therewith, the gear 81 slides into engagement with a gear 84 formed around the rear of the spindle 11 as well as being engaged with the gear 82. Since the gear 82 is fixed with respect to the spindle, the simultaneous engagement of the gear 81 with it and with the gear 84 will lock the spindle 11 against rotation in the carrier 10.

The roller sprag clutch mechanism with the sets of rollers 64, 65 is bidirectional in that it will transmit torque in either direction from the member 66 to the friction clutch member 54. The amount of torque which is transmitted between the cone surfaces 55, 57 of the friction clutch portion is determined by the bias force imposed by the spring washers 60. Assuming the drawbolt 32 to be threaded with a right hand helix, the drawbolt 32 must be turned to take up a cutter in a direction such that the gear 72 of the clutch member 56 is rotated clockwise as viewed in FIG. 3. Therefore the member 66 is also rotated clockwise and the roller 64 of each set is wedged against the surfaces 63 to drive the member 54, and with it the member 56, clockwise. The drawbolt 32 upon turning fully into the cutter will suddenly impose a high resistance to turning on the clutch mechanism and when this resistance exceeds the magnitude of torque transmittable between the surfaces 55, 57 the members 54, 56 will relatively slip. Since the clutch member 56 is coupled directly to the drawbolt 32 through the intermediate connection of the bushing 49, it will stop rotating while the member 54 continues to rotate clockwise as viewed in FIG. 3.

The clutch mechanism is arranged and provided with means for disconnecting the drive to the clutch member 54 from the driving member 66 when the two friction members 54, 56 have slipped a predetermined amount relative to one another in one direction to prevent excessive heat and wear of these parts. As can be seen in FIG. 7, the disconnect member 61 has a set of axially projecting arcuate portions 85. In the assembly these projecting portions 85 extend through notches 86 in the washer 62 and over areas 87 of reduced radial distance from the center of the clutch member 54 and fit into notches 88 spaced around the clutch member 56. The projections 85 fit closely into the notches 88 and therefore the disconnect member moves in unison with the clutch member 56. As a result, when the member 56 is stopped from rotating in the clockwise direction as viewed in FIG. 3, the rollers 64 will continue clockwise with the member 66 and clutch part 54 until they contact the projections 85 and are shifted from their wedged driving position. The member 66 will then rotate freely in the clockwise direction with respect to the female clutch member 54 also.

It normally requires more torque to withdraw the drawbolt 32 from a cutter that was previously used in the take-up to firmly attach the cutter. This is due to various factors, one of the more important being that the static friction load at the start of the release is high. Therefore the described disconnect member 61 is used to positively connect the male clutch member 56 to the female member 54 to prevent relative slippage when release of a cutter is desired. This permits a greater torque to be transmitted through the mechanism in the cutter release operation. For this reason shoulder abutments 89 are formed on the member 54. Upon the counter-clockwise rotation of the member 66, the rollers 65 will carry the clutch member 54 clockwise and since the start up load on the member 56 is very high, the two friction clutch members 54, 56 will slip along their cone surfaces 55, 57 until the shoulders 89 are carried into contact with the projections 85. The drive from the member 54 to the member 56 will be through the disconnect member to bypass the friction drive surfaces 55, 57. Therefore full available torque is used to effect counter-clockwise rotation of the member 56, as viewed in FIG. 3, and with it rotation of the drawbolt 32 in the cutter release operation.

It should be pointed out that occasionally the drawbolt 32 will be loosened without requiring more torque than was used in tightening it into a cutter. In these cases, the release drive will be through the friction surfaces 55, 57 and the clutches will remain released for take-up drive. It might be impossible to connect another cutter in the spindle 11 if some means is not provided for resetting the clutch drive to the condition shown in FIG. 3. Therefore a socket 90 is provided in the forward end of the drawbolt 32 to provide means for connecting to the drawbolt 32 a high resistance to rotation so that the mechanism can be snapped back to the condition shown after which the new cutter can be attached. This will occur infrequently however.

While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:
1. The combination comprising:
(a) a spindle carrier,
(b) a spindle rotatably supported in said carrier,
(c) a drawbolt received centrally through said spindle for rotation therein,
(d) a drive member in said carrier for providing a drive torque bidirectionally,
(e) means for selectively connecting said spindle and drive member in train for rotation of said spindle, and
(f) means for selectively locking said spindle against rotation and for simultaneously connecting said drawbolt in train with said drive member to be rotated in one direction by a first maximum amount of torque from said drive member and in the other direction by a second and greater maximum amount of torque from said drive member.

2. The combination comprising:
(a) a spindle carrier,
(b) a spindle rotatably supported in said carrier,
(c) a drawbolt received centrally through said spindle for rotation therein,
(d) a drive member in said carrier for providing a drive torque bidirectionally,
(e) means for selectively connecting said spindle and drive member in train for rotation of said spindle,
(f) means for selectively connecting said drawbolt and drive member in train for rotation of said drawbolt in one direction by a limited amount of said drive torque available at said drive member,
(g) means for selectively connecting said drawbolt and drive member in train for rotation of said drawbolt in the other direction by a torque greater than said limited amount, and
(h) means for locking said spindle against rotation when said drawbolt and drive member are connected in train.

3. The combination comprising:
(a) a spindle carrier,
(b) a spindle rotatably supported in said carrier,
(c) a drawbolt received centrally through said spindle for rotation therein,
(d) a drive member in said carrier for providing a drive torque bidirectionally,
(e) means for selectively connecting said spindle and drive member in train for rotation of said spindle,
(f) first means for selectively connecting said drawbolt and drive member in train for rotation of said drawbolt in one direction by a limited amount of said drive torque available at said drive member,
(g) second means for selectively connecting said drawbolt and drive member in train to bypass said first means for positive rotation of said drawbolt in the other direction by the full torque available at said drive member, and
(h) means for locking said spindle against rotation when said drawbolt and drive member are connected in train.

4. The combination comprising:
(a) a spindle carrier,
(b) a spindle rotatably supported in said carrier,
(c) a drawbolt received centrally through said spindle for rotation therein,
(d) a rotatable drive member, in said carrier for providing a drive torque bidirectionally,
(e) means for selectively connecting said drive member to rotate said spindle,
(f) a friction clutch movable in said carrier between operative and inoperative positions, said clutch in the operative position adapted to connect said drive member and drawbolt in train for transmission of a predetermined magnitude of said drive torque to said drawbolt,
(g) means for disconnecting said friction clutch from said drive member when said drawbolt encounters a resistive torque of greater magnitude than said predetermined magnitude in one direction,
(h) means for bypassing said friction clutch in the operative position to positively connect said drive member to said drawbolt and transmit torque thereto in the other direction,
(i) means for shifting said friction clutch to the operative position from the inoperative position, and (j) means for locking said spindle against rotation in response to movement of said friction clutch to the operative position thereof.

5. The combination comprising:
(a) a spindle carrier,
(b) a spindle rotatably supported in said carrier,
(c) a drawbolt received centrally through said spindle for rotation therein and for limited axial movement therethrough,
(d) a rotatable drive member in said carrier for providing a drive torque bidirectionally,
(e) a friction clutch movable in said carrier between operative and inoperative positions, said clutch in the operative position adapted to connect said drive member and said drawbolt in train for transmission of a predetermined magnitude of said drive torque to said drawbolt,
(f) means for disconnecting said friction clutch from said drive member when said drawbolt encounters a resistive torque of greater magnitude than said predetermined magnitude in one direction,
(g) means for bypassing said friction clutch in the operative position to positively connect said drive member to said drawbolt and transmit torque thereto in the other direction,
(h) means for shifting said friction clutch to the operative position from the inoperative position, and
(i) means for locking said spindle against rotation in response to movement of said friction clutch to the operative position thereof.

6. The combination comprising:
(a) a spindle carrier,
(b) a spindle rotatably supported in said carrier,
(c) a drawbolt received centrally through said spindle for rotation therein and for limited axial movement therethrough,
(d) a rotatable drive member in said carrier for providing a drive torque bidirectionally,
(e) a friction clutch movable in said carrier between operative and inoperative positions, said friction clutch in the operative position adapted to connect with said drawbolt for transmisison of a predetermined magnitude of torque thereto,
(f) a roller sprag clutch movable in said carrier with said friction clutch and adapted to connect said friction clutch in train with said drive member when said friction clutch is in the operative position,
(g) means for disconnecting said sprag clutch from said friction clutch when said drawbolt encounters a resistive torque of greater magnitude than said predetermined magnitude in one direction,
(h) means for positively connecting said sprag clutch in train with said drawbolt and drive member to bypass said friction clutch for rotation of said drawbolt in the other direction,
(i) means for shifting said friction clutch to the operative position from the inoperative position, and
(j) means for locking said spindle against rotation in response to movement of said friction clutch to the operative position thereof.

7. The combination comprising:
(a) a spindle carrier,
(b) a spindle rotatably supported in said carrier,
(c) a drawbolt received centrally through said spindle for rotation therein and for limited axial movement therethrough,
(d) a drive gear in said carrier for providing a drive torque bidirectionally,
(e) a friction clutch movable in said carrier between operative and inoperative positions and adapted to transmit a predetermined magnitude of torque therethrough,
(f) a roller sprag clutch movable in said carrier with said friction clutch and connected thereto for transmission of torque therebetween,
(g) a gear connected to said roller sprag clutch and movable therewith to a position in mesh with said drive gear when said friction clutch is moved to the operative position,
(h) means for connecting said friction clutch to said drawbolt when said friction clutch is in the operative position to complete a transmission train from said drive gear to said drawbolt through said friction clutch for transmission of said predetermined magnitude of torque,
(i) means for disconnecting said sprag clutch from said friction clutch when said drawbolt reflects to said friction clutch a resistance to torque in one direction greater than said predetermined torque.
(j) means for positively connecting said sprag clutch to said drawbolt positively to transmit torque from said drive gear in the other direction to bypass said friction clutch.
(k) means for shifting said friction clutch between the operative and inoperative positions thereof, and
(l) means for locking said spindle against rotation in response to movement of said friction clutch to the operative position.

8. The combination comprising:
(a) a spindle carrier,
(b) a spindle rotatably supported in said carrier,
(c) a drawbolt received centrally through said spindle for rotation therein and for limited axial movement therethrough,
(d) a drive member in said carrier for providing a torque drive bidirectionally,
(e) a cone clutch in the carrier having male and female friction members concentric with respect to said drawbolt,
(f) a sprag clutch received over said cone clutch, concentric with said drawbolt and adapted for driving one of said friction members bidirectionally,
(g) means for holding said friction members together to transmit a predetermined torque from one to the other,
(h) means for locking said spindle against rotation and for simultaneously connecting said sprag clutch to said drive member and the other of said friction members to said drawbolt to complete a transmission train from said drive member to said drawbolt, and
(i) means for disconnnecting said sprag and cone clutches in response to slippage between said friction members to limit the torque transmitted in one direction to said drawbolt and for positively connecting said sprag clutch to said other of the friction members to transmit full torque from said drive member to said drawbolt in the other direction.

9. The combination comprising:
(a) a spindle carrier,
(b) a spindle rotatably supported in said carrier,
(c) a drawbolt received centrally through said spindle for rotation therein and for limited axial movement therethrough,
(d) a drive member in said carrier for providing a torque drive bidirectionally,
(e) a cone clutch in the carrier having male and female friction members concentric with respect to said drawbolt,
(f) a sprag clutch received over said cone clutch, concentric with said drawbolt and having a plurality of sets of drive rollers therein adapted for driving one of said friction members bidirectionally,
(g) bias means for holding said friction members together with a fixed force to transmit a predetermined torque from one to the other thereof,
(h) means for locking said spindle against rotation and for simultaneously connecting said sprag clutch to said drive member and the other of said friction members to said drawbolt to complete a transmission train from said drive member to said drawbolt, (i) a disconnect member connected to rotate with said other friction member and relative to said one friction member in one direction,
(j) said disconnect member having portions extending through said sprag clutch in proximity with said rollers and adapted to engage thereagainst when said disconnect member rotates relative to said one friction member to disengage said sprag clutch therefrom, and
(k) means for preventing rotation of said disconnect member relative to said one friction member in the other direction beyond a fixed angular relation to provide a positive drive only in said other direction between said friction members.

10. The combination comprising:
(a) a spindle carrier,
(b) a spindle rotatably supported in said carrier,
(c) a drawbolt received centrally through said spindle for rotation therein,
(d) a drive member in said carrier for providing a torque drive bidirectionally,
(e) a set of three clutch members axially movable in unison in said carrier and concentric with respect to said drawbolt,
(f) connecting means interposed and engaged between the first and second of said clutch members for transmitting torque therebetween bidirectionally,
(g) mating friction surfaces in engagement between the second and third of said clutch members,
(h) means holding said second and third clutch members in contact at said friction surfaces for permitting transmission of a predetermined maximum torque therebetween,
(i) means responsive to slippage between said friction surfaces in one direction for disengaging said connecting means,
(j) means for preventing slippage between said second and third clutch members in the other direction beyond a predetermined relative angular position to transmit torque positively therebetween,
(k) means for axially shifting said clutch members between operative and inoperative axial positions in said carrier,
(l) means integral with said first clutch member for connecting said drive member thereto when said clutch members are in the operative position,
(m) means integral with said third clutch member for connecting said drawtbolt thereto, and
(n) means for preventing rotation of said spindle when said clutch members are in the operative position.

No references cited.

WILLIAM W. DYER, JR., *Primary Examiner.*

G. A. DOST, *Assistant Examiner.*